(12) United States Patent
Niu et al.

(10) Patent No.: US 11,829,721 B2
(45) Date of Patent: Nov. 28, 2023

(54) SYSTEMS AND METHODS FOR UNSUPERVISED PARAPHRASE GENERATION

(71) Applicant: salesforce.com, inc., San Francisco, CA (US)

(72) Inventors: Tong Niu, Sunnyvale, CA (US); Semih Yavuz, Redwood City, CA (US); Yingbo Zhou, Mountain View, CA (US); Nitish Shirish Keskar, San Francisco, CA (US); Huan Wang, Palo Alto, CA (US); Caiming Xiong, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 483 days.

(21) Appl. No.: 17/161,214

(22) Filed: Jan. 28, 2021

(65) Prior Publication Data

US 2022/0129629 A1 Apr. 28, 2022

Related U.S. Application Data

(60) Provisional application No. 63/104,988, filed on Oct. 23, 2020.

(51) Int. Cl.
| | | |
|---|---|---|
| G10L 15/065 | (2013.01) | |
| G06N 3/0455 | (2023.01) | |
| G06F 18/20 | (2023.01) | |
| G06F 40/20 | (2020.01) | |
| G06F 40/289 | (2020.01) | |
| G06F 40/45 | (2020.01) | |
| G06F 40/284 | (2020.01) | |
| G06F 40/242 | (2020.01) | |
| G06F 18/22 | (2023.01) | |
| G06F 18/214 | (2023.01) | |
| G06N 7/01 | (2023.01) | |

(52) U.S. Cl.
CPC ......... *G06F 40/284* (2020.01); *G06F 18/214* (2023.01); *G06F 18/22* (2023.01); *G06F 40/242* (2020.01); *G06N 7/01* (2023.01)

(58) Field of Classification Search
USPC ............ 382/155–159, 190–225; 704/1–275; 706/1–62, 900–903
See application file for complete search history.

(56) References Cited

U.S. PATENT DOCUMENTS

| | | | |
|---|---|---|---|
| 11,042,712 B2 * | 6/2021 | Prakash | G06N 3/044 |
| 11,620,343 B2 * | 4/2023 | Kim | G06F 18/22 |
| | | | 707/728 |

(Continued)

*Primary Examiner* — Marcellus J Augustin
(74) *Attorney, Agent, or Firm* — HAYNES AND BOONE LLP

(57) ABSTRACT

Embodiments described herein provide dynamic blocking, a decoding algorithm which enables large-scale pretrained language models to generate high-quality paraphrases in an un-supervised setting. Specifically, in order to obtain an alternative surface form, when the language model emits a token that is present in the source sequence, the language model is prevented from generating the next token that is the same as the subsequent source token in the source sequence at the next time step. In this way, the language model is forced to generate a paraphrased sequence of the input source sequence, but with mostly different wording.

20 Claims, 8 Drawing Sheets

(56) References Cited

U.S. PATENT DOCUMENTS

| | | | |
|---|---|---|---|
| 2019/0287012 A1* | 9/2019 | Celikyilmaz | G06F 16/345 |
| 2020/0134016 A1* | 4/2020 | Cao | G06F 40/284 |
| 2020/0372217 A1* | 11/2020 | Abuammar | G06N 3/08 |
| 2021/0110816 A1* | 4/2021 | Choi | G10L 15/063 |
| 2021/0133224 A1* | 5/2021 | Tiwari | G06F 16/319 |
| 2021/0133251 A1* | 5/2021 | Tiwari | G06F 40/205 |
| 2021/0390418 A1* | 12/2021 | Mass | G06N 3/045 |

* cited by examiner

Algorithm 1: Dynamic Blocking input : A source sequence $S$ consisting of a list of tokens $S = (S_0, S_1, \ldots, S_M)$, and a $G_0 = \text{BOS}$ to start the decoding process 1 Initialize $j \leftarrow 1$
2 while $G_{j-1} \neq \text{EOS}$ do
3    if $G_{j-1} = S_i \in S$ for some $i$ then
4       $P(G_j = S_{i+1} | S, (G_0, G_1, \ldots, G_{j-1})) \leftarrow 0$
5    end
6    Generate $G_j$
7    $j \leftarrow j + 1$
8 end output : $G = (G_0, G_1, \ldots, G_N)$

*FIG. 5*

| Dataset | Final v.s. Model | Win | Tie | Loss | Win-Loss |
|---|---|---|---|---|---|
| QQP | Transformer | 163 | 113 | 124 | 39 |
|  | CorruptLM | 184 | 105 | 111 | 72 |
|  | Ground-truth | 172 | 67 | 161 | 11 |
| ParaNMT | SOW-REAP | 162 | 114 | 124 | 38 |
|  | Ground-truth | 198 | 58 | 144 | 54 |

Table 1: Head-to-head human evaluation results.

FIG. 6

| Data | | Model | Avg. Score |
|---|---|---|---|
| QQP | Supervised | Transformer | 4.04 ± 1.01 |
|  | Unsupervised | CorruptLM | 3.74 ± 1.26 |
|  |  | Final (QQP) | 4.19 ± 0.99 |
| ParaNMT | Supervised | SOW-REAP | 3.78 ± 1.15 |
|  | Unsupervised | Final (ParaNMT) | 3.94 ± 1.09 |

Table 2: Likert-scale human evaluation results.

FIG. 7

|  | BertBLEU | iBLEU | BLEU | Rouge1 | Rouge2 | RougeL |
|---|---|---|---|---|---|---|
| % of agreements | 68.9 | 39.4 | 45.3 | 21.8 | 5.4 | 21.4 |

Table 3: The percentage of times where each metric agrees with human evaluation results in the head-to-head studies. Only cases where two annotators agree are counted.

FIG. 8

|  | Model | Quora | | | | | |
|---|---|---|---|---|---|---|---|
|  |  | BertBLEU | iBLEU | BLEU | Rouge1 | Rouge2 | RougeL |
| Supervised | Transformer | 63.8 | 17.0 | 22.3 | 55.8 | 32.3 | 57.5 |
| Unsupervised | CorruptLM | 61.5 | 12.1 | 16.8 | 49.1 | 26.2 | 51.7 |
|  | Task-adaptation | 76.0 | 16.0 | 21.2 | 61.9 | 35.1 | 61.7 |
|  | Final (w/o DB) | 78.9 | 15.6 | 20.7 | 61.5 | 32.8 | 60.7 |
|  | Final (ParaNMT) | 82.1 | 10.1 | 14.6 | 60.1 | 28.5 | 58.6 |
|  | Final | 83.1 | 9.6 | 14.1 | 59.9 | 28.5 | 58.8 |
| No Model | Copy-input | 0.0 | 24.3 | 30.4 | 65.7 | 41.7 | 66.5 |

Table 4: Automatic evaluation results on the QQP

FIG. 9

|  | Model | BertBLEU | Oracle Quality (10 sentences) | | | |
|---|---|---|---|---|---|---|
|  |  |  | BLEU | Rouge1 | Rouge2 | RougeL |
| Supervised | SOW-REAP | 54.2 | 30.9 | 62.3 | 40.2 | 61.7 |
| Unsupervised | CorruptLM (QQP) | 39.7 | 7.6 | 31.9 | 11.6 | 31.6 |
|  | Final (QQP) | 76.8 | 22.0 | 60.1 | 33.8 | 54.9 |
|  | Final | 78.0 | 22.6 | 59.8 | 33.2 | 54.5 |
| No Model | Copy-input | 0.0 | 18.4 | 54.4 | 27.2 | 49.2 |

Table 5: Automatic metric results on the ParaNMT

FIG. 10

|  | AddMask | NoShuffle | Delete-Shuffle |
|---|---|---|---|
| BertBLEU | 80.7 | 81.7 | 83.1 |

Table 6: Ablation studies on different corruption strategies for task-adaptation.

FIG. 11

| Input | Generated paraphrase |
|---|---|
| We got to spend the rest of the weekend at the track, yeah. | We got to stay at the track for the rest of the weekend, yeah. |
| Are predictions of the future based on the present too much? | Are future predictions too much based on the present? |
| What is the best way to reduce belly and arm fat? | What is the easiest way to reduce arm and belly fat? |
| You can seduce enemy soldiers, though. | You can, though, seduce enemy troops. |
| Well, why would your buddy be in the shower with you?! | Okay, why would you be in the shower with your friend?! |
| The existing domain will not have mail stored properly. | The domain will not have properly stored mail. |
| It was not a vocal medium artificially constructed. | It was not an artificially constructed vocal medium. |
| Find someone by tomorrow who can vouch for you. | Find someone who can vouch for you by tomorrow. |

Table 7: Selected paraphrases generated by our final model that shows syntactic variance at different extents. Only the top candidate is shown for each input.

FIG. 12

| | German | Translation from German |
|---|---|---|
| Input | Warum finden keine Brandschutzbelehrungen statt? | Why are there no fire instructions? |
| | Warum lesen keine Geschützbelehrungen statt? | Why were there no protection instructions? |
| | Warum finden keine Geschützbelehrungen statt? | Why are there no protection instructions? |
| | Warum lesen keine Brandschutzbelehrungen statt? | Why weren't there any fire safety instructions? |
| Candidates | Warum finden keine Geschützbelehrungen statt? | Why are there no protection instructions? |
| | Warum finden wir keine Geschützbelehrungen statt? | Why are there no protection instructions? |
| | Warum finden wir keine Brandschutzbelehrungen statt? | Why are we not giving fire safety instructions? |
| | Warum finden vor keine Brandschutzbelehrungen en? | Why are there no fire safety instructions? |
| | Warum finden keine Brandschutzbelehrungen statt? | Why are there no protection instructions? |

Table 8: Paraphrasing with German input using the unsupervised BART. Translations on the right are given by the Google Translator, except that the first one is the ground-truth translation. Note that the candidates are ranked by multi-lingual BERT rather than RoBERTa-based when paraphrasing in English.

FIG. 13

SYSTEMS AND METHODS FOR UNSUPERVISED PARAPHRASE GENERATION

CROSS REFERENCE(S)

The present disclosure is a nonprovisional of and claims priority under 35 U.S.C. 119 to U.S. provisional application No. 63/104,988, filed Oct. 23, 2020, which is hereby expressly incorporated by reference herein in its entirety.

TECHNICAL FIELD

The present disclosure relates generally to machine learning models and neural networks, and more specifically, to unsupervised paraphrase generation via dynamic blocking.

BACKGROUND

Paraphrase is a semantic relationship between sentences. For example, two sentences that have the same meaning but possibly different wording are called paraphrase of each other. Paraphrase generation maintains the semantics of a text input but differs in the surface form, e.g., different tokens. Paraphrase generation can be used to generate adversarial examples for evaluating model robustness. The paraphrased input examples can also be leveraged to train neural networks so that the neural networks are more robust to adversarial at-tacks. For example, in question-answering (QA) systems, paraphrasing input questions not only augments training dataset, but also makes an input question more likely to match with key words in a knowledge base. Paraphrasing also has multiple applications such as text summarization, semantic parsing, as well as diversifying text generation for user-facing systems such as a chatbot. Existing systems generally rely on human annotation to identify paraphrases, which can be expensive and time-consuming, resulting in very few datasets of paraphrases that are human-labeled.

BRIEF DESCRIPTION OF THE DRAWINGS

FIG. 5 provides a simplified pseudo-code algorithm for dynamic blocking, according to embodiments described herein.

FIGS. 6-13 provide example data tables illustrating example performance of paraphrase generation with dynamic blocking, according to embodiments described herein.

In the figures and appendix, elements having the same designations have the same or similar functions.

DETAILED DESCRIPTION

In view of the need to generate and use paraphrased training examples for training a neural model, embodiments described herein provide dynamic blocking, a decoding algorithm which enables large-scale pretrained language models to generate high-quality paraphrases in an unsupervised setting. For example, the large-scale pretrained language models may be BART (see Lewis et al., BART: Denoising sequence-to-sequence pre-training for natural language generation, translation, and comprehension, arXiv preprint arXiv:1910.13461, 2019), or mBART (see Liu et al., BART: Denoising sequence-to-sequence pre-training for natural language generation, translation, and comprehension, arXiv preprint arXiv:1910.13461, 2019), both of which are hereby expressly incorporated by reference herein in their entirety.

Specifically, in order to obtain an alternative surface form, when the language model emits a token that is present in the source sequence, the language model is prevented from generating the next token that is the same as the subsequent source token in the source sequence at the next time step. In this way, the language model is forced to generate a paraphrased sequence of the input source sequence, but with mostly different wording.

In one embodiment, a new automatic metric is adopted based on self-BLEU and BERT-score. The automatic metric may be used to discourage the language model from copying the input, and also evaluate text similarity based on distributed representations, hence avoiding relying on exact keyword matching. This metric correlates better with human evaluation results as compared to existing metrics for paraphrasing such as BLEU and ROUGE.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

OVERVIEW

Figure 1:
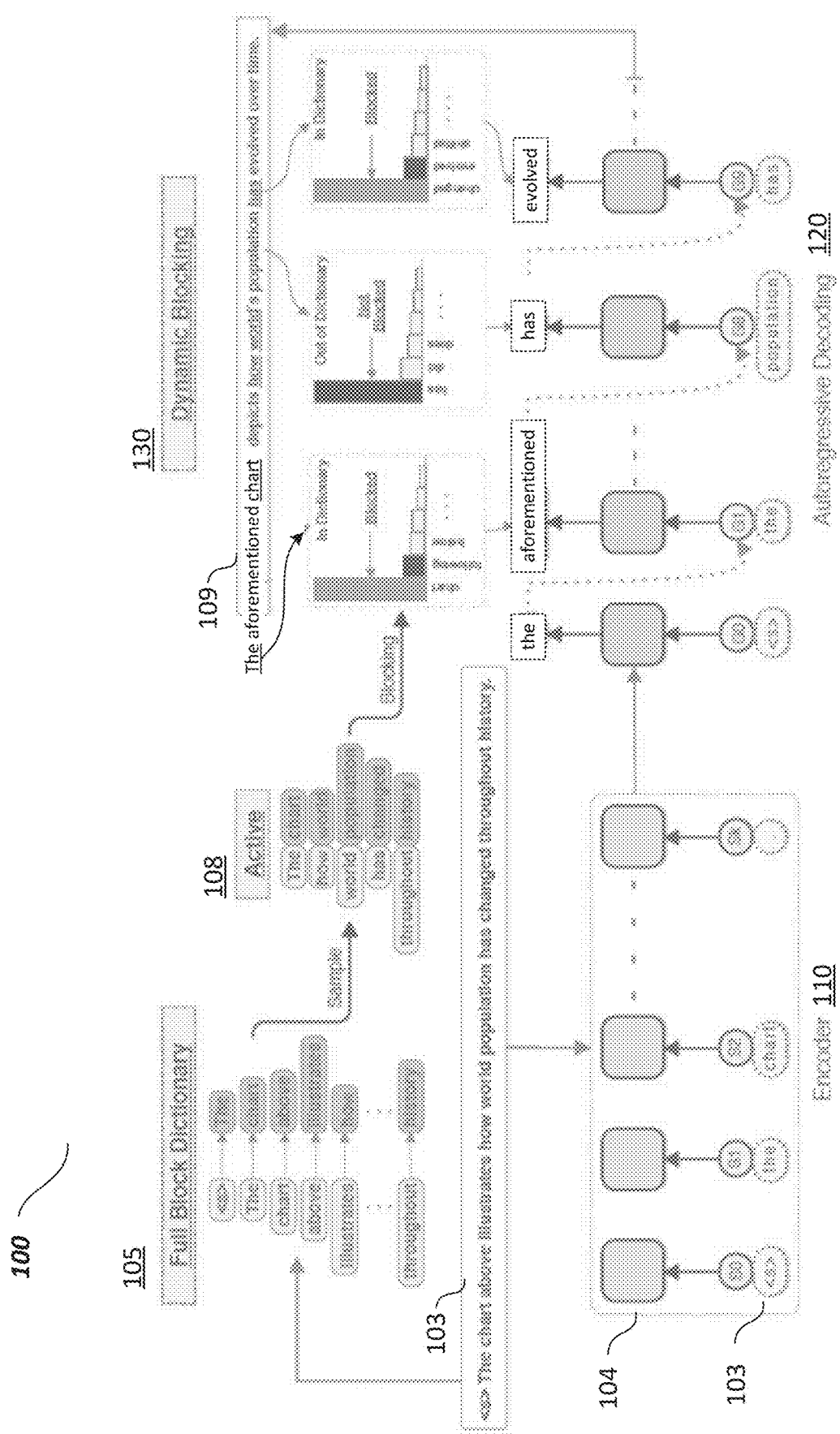
FIG. 1 shows a simplified illustration of the architecture of a language model for generating a paraphrase of an input text via dynamic blocking, according to the embodiments described herein.

FIG. 1 shows a simplified illustration of the architecture 100 of a language model for generating a paraphrase of an input text via dynamic blocking, according to the embodiments described herein. The language model includes an encoder 110 and an autoregressive decoder 120. The encoder 110 receives an input of a natural language sentence 103, e.g., "the chart above illustrates how world population has changed through history." The sentence 103 (including a start token <s>) can be represented as a source sequence S as a list of tokens $S=(S_0, S_1, \ldots, S_M)$. The input source sequence 103 is then encoded by the encoder 110 as a vector representation 104.

The decoder 120 receives the encoded vector representation 104 and generates a paraphrased sentence 109. Specifically, the decoder 120 generates the paraphrased sentence 109 by emitting a generated sequence of tokens represented as $G=(G0, G1, \ldots, GN)$. During generation, the decoder 120 may emit $G_j$ that is identical to some $S_i$ in the source sequence 103 (it is not necessary that i=j). In this case, if too many tokens in the generated sequence G are identical to the tokens in the source sequence S, the generated paraphrase is considered with low quality, because the generated sequence does not "paraphrase" the source sequence, but merely copies the source sequence.

To allow the possibility of syntactic variation of the original sequence 103, one goal is to have the decoder 120 generates non-identical tokens compared to the source sequence 103. One example would be to completely prevents the model from generating a source token at all generation steps, referred to as Static Blocking. For example, if the language model of encoder 110 and decoder 120 intend to paraphrase the sentence of "I like apples and oranges." A paraphrased version "I like oranges and apples," which merely permutates the order of "oranges" and "apples" in the original sentence, is a valid paraphrase. However, if the decoder implements Static Blocking which completely blocks the word "apples" at all time steps, the decoder cannot possibly arrive at this paraphrase.

Instead, the decoder 120 employs a Dynamic Blocking mechanism 130, which allows the generation of the word "apples" later on even though this word has been briefly blocked after "and" is generated. For example, a block dictionary 105 is built with the encoder 110. The block dictionary 105 maps each token in the source sequence 103 to its immediate successor, e.g., "the"→"chart," "chart"→"above," and/or the like. Each entry in the block dictionary 105 is sampled with a probability p. This hyperparameter p controls how different the resulting paraphrase is from the source input. For example, in the two extreme cases: when p=0.0, the model does not block any tokens and most likely copies the source sequence as a "paraphrase"; when p=1.0, the model always blocks the same immediate next token, leading to a drastically different surface form for the resulting paraphrase. One example is to set p=0.5 so that for each blocking action, there will be half of the candidates taking that path.

In one embodiment, a subset of active block entries 108 are sampled from the block dictionary 105, which controls what tokens are to be blocked in generating the paraphrase 109. Then during the generation of the next token $G_{j+1}$, to prevent generating an identical, or largely identical sentence as the source sentence 103, the decoder 120 is prohibited from generating the same next token $S_{i+1}$ as $G_{j+1}$ when the current generated token $G_j$ is within the sampled block entries 108. In this way, such blocking mechanism forces the generated sequence 109 to largely deviate from the original one 103. Note that the blocking of $S_{i+1}$ only lasts for one time step. After $G_{j+1}$ is generated, the decoder 120 performs a different blocking depending on whether the generated $G_{j+1} \in S$.

In one embodiment, to achieve the diversity needed for text generation, multiple versions of the subset of active block entries 108 from the full block dictionary 105 may be obtained to generate multiple versions of the paraphrase 109, thus providing diversity among candidates, while leveraging beam search to ensure coherence. For each sampled block entry, beam search is used to generate several candidates and the top-ranked two may be kept.

For example, when a token "the" is emitted, the dynamic blocking mechanism 130 identifies that the token "the" is in the subset of active block entries 108, which maps token "the" to its successor "chart" in the source sequence 103. The decoder 120 may perform beam search on the token "the" to generate a set of candidates for the next token, e.g., "chart," "aforementioned," 'below," and/or the like. The autoregressive decoder 120 is then prevented from emitting the token "chart" subsequent to "the," because the block entry "the"→"chart" is active. Then the decoder 120 has to emit the token "aforementioned" instead. For another example, when the autoregressive decoder 120 generates the token "population," the token "population" is not found in any active block entry 108 that has been sampled, and thus the subsequent token "has" having the highest probability from a beam search is not blocked. Therefore, the autoregressive decoder 120 may emit "has" subsequent to the token "population." In this way, the decoder 120 may generates the output sequence 109, e.g., "the aforementioned chart depicts how world's population has evolved over time."

Figure 2:
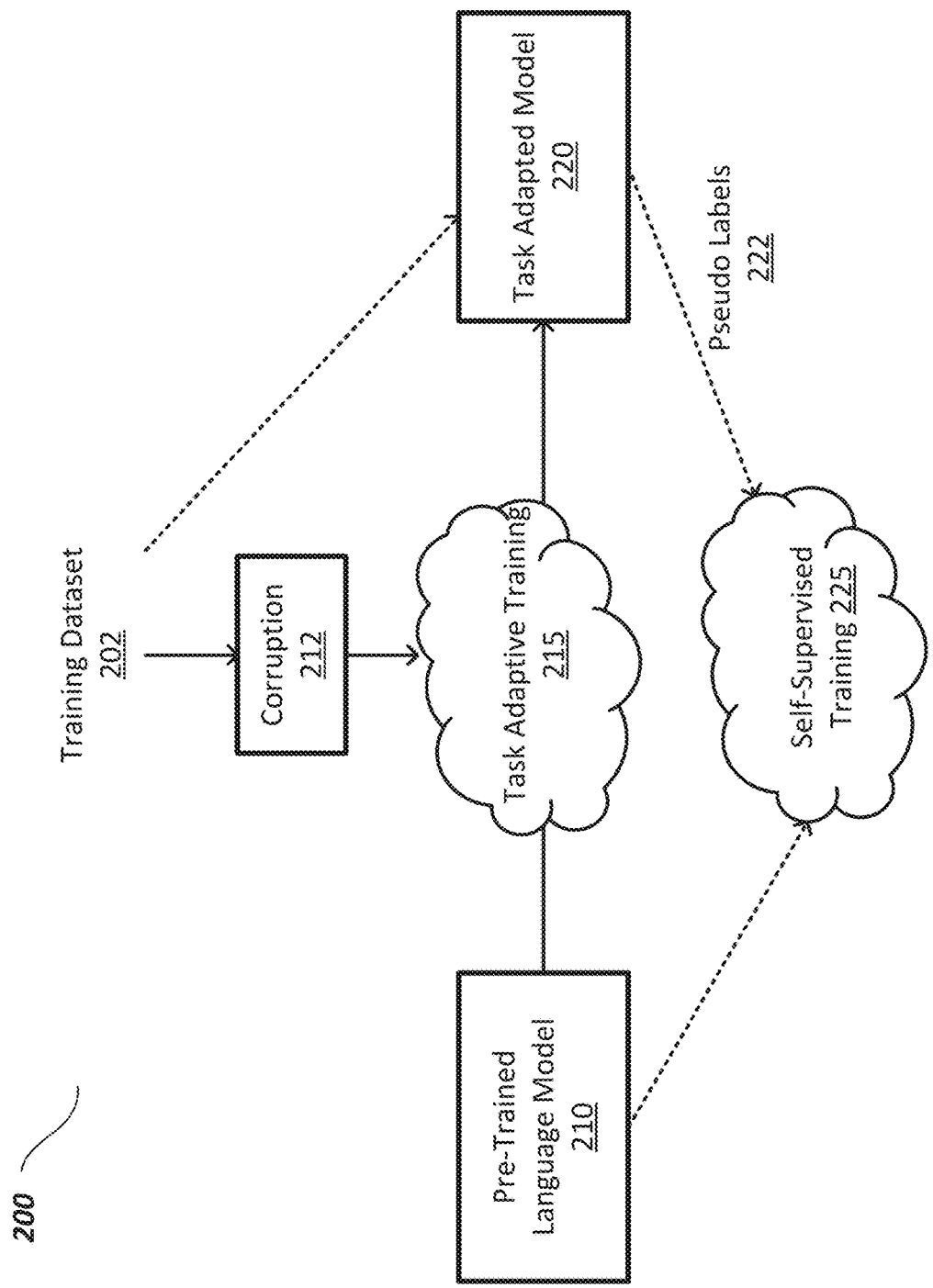
FIG. 2 is a simplified diagram illustrating a training mechanism of the language model of encoder and decoder as described in FIG. 1, according to embodiments described herein.

FIG. 2 is a simplified diagram 200 illustrating a training mechanism of the language model of encoder 110 and decoder 120 as described in FIG. 1, according to embodiments described herein. The language model 210, such as a pre-trained BERT may be trained over two stages: (1) task-adaptive training 215 followed by (2) self-supervised training 225.

First, the language model 210 of encoder 110 and decoder 120 may be trained using task-adaptive training 215 on a target training dataset 202, treating its training set as a non-parallel corpus (i.e., a collection of sentences instead of pairs of sentences and paraphrasers). A training sequence from the training dataset 202 may be corrupted at 212 before sending for training. During task adaptive training 215, the language model learns to reconstruct the original sequence from its corrupted version (i.e. using a denoising auto-encoder objective). The input may not be corrupted with masks, but rather directly remove the corrupted tokens. This is to avoid pretrain-finetune discrepancy in denoising auto-encoding models because the inputs to the paraphraser do not contain any masks. After the deletions, all remaining tokens may be randomly shuffled to encourage the model to learn different alignments so that the model can achieve better syntactic diversity.

In one implementation, both deletions and shuffling of the training data sequence are performed on the word level. This is similar to whole-word masking introduced in later versions of BERT.

Therefore, after task adaptive training 215, the language model is trained to be a task-adapted model 220.

The second stage training is self-supervised training 225. Instead of continue training on the task-adapted model 220, the self-supervised training 225 starts with the pre-trained language model 210 to avoid catastrophic forgetting, because Dynamic Blocking is applied to generate self-supervision data. Specifically, to help the model internalize the regularizations imposed by Dynamic Blocking, self-supervision may be implemented during training by pseudo-labeling the training set with the task-adapted model 220 so that during inference the model is less reliant on them and generate more diverse candidates. In other words, pseudo-labels 222 generated by the task-adapted model 220 from the training dataset 202 may be fed to self-supervised training process 225 as the ground-truth labels to train the pre-trained language model 210.

Another benefit of self-supervision 225 is that during task-adaptation, the target sequence is always longer than the source sequence due to corruption; yet during self-supervision, reversed data may be included (i.e., swapping source and target) to familiarize the model with generating paraphrases of shorter lengths.

Computer Environment

Figure 3:
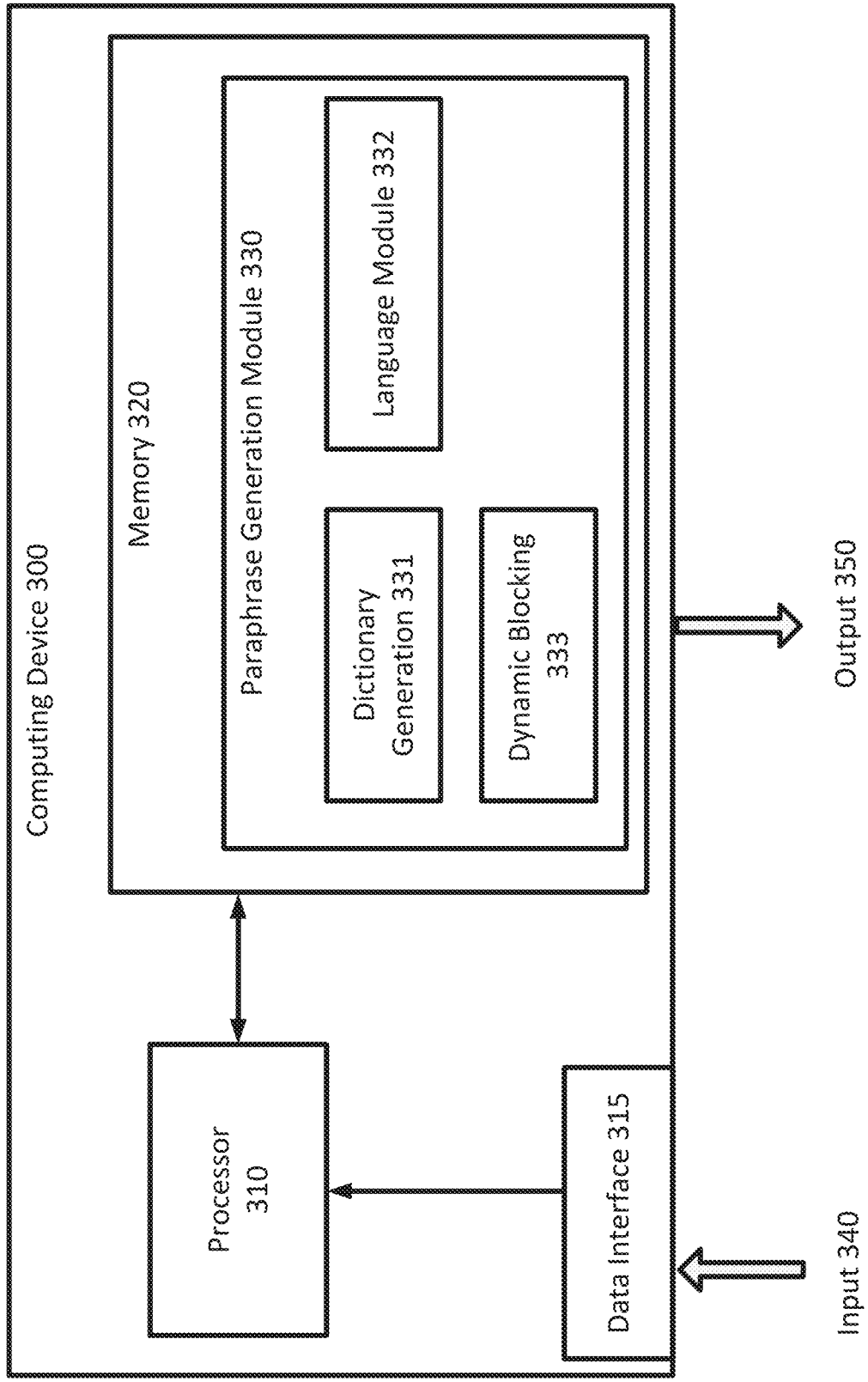
FIG. 3 is a simplified diagram of a computing device for implementing the dynamic blocking for paraphrase generation, according to some embodiments.

FIG. 3 is a simplified diagram of a computing device for implementing the dynamic blocking for paraphrase generation, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a paraphrase generation module 330 that may be used to implement and/or emulate the systems and models, and/or to implement any of the methods described further herein. In some examples, the paraphrase generation module 330, may receive an input 340, e.g., such as an input text, via a data interface 315. The data interface 315 may be any of a user interface that receives an articulated audio input, or a communication interface that may receive or retrieve a previously stored training text from the database. The paraphrase generation module 330 may generate an output 350 such as a paraphrased text corresponding to the input 340.

In some embodiments, the paraphrase generation module 330 may implement the dynamic blocking mechanism model including the language module 332, e.g., encoder 110 and decoder 120 shown in FIG. 1. The paraphrase generation module 330 further includes a dictionary generation module 331 and a dynamic blocking module 333. The dictionary generation module 331 may be configured to generate active dictionaries 108 as a pool for determining whether to block an emitted token from the language module 332. The dynamic block module 333 may be configured to block an emitted token from the language module 332, based on the active dictionaries generated by the dictionary generation module 331.

In some examples, the paraphrase generation module 330 and the sub-modules 331-333 may be implemented using hardware, software, and/or a combination of hardware and software.

Work Flows

Figure 4:
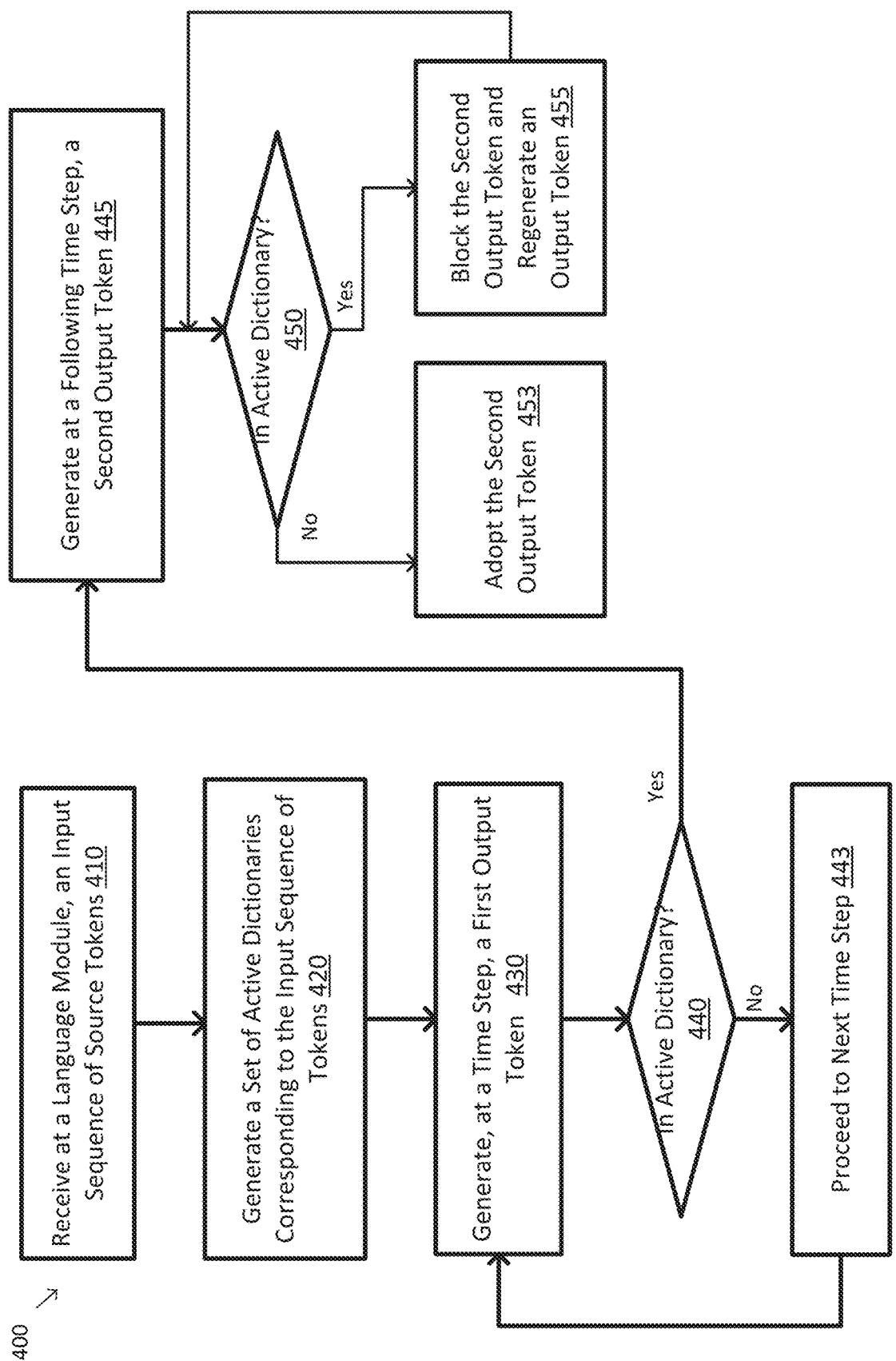
FIG. 4 is a simplified logic flow diagram illustrating a method for generating a paraphrase text, according to some embodiments described herein.

FIG. 4 is a simplified logic flow diagram illustrating a method for generating a paraphrase text, according to some embodiments described herein. One or more of the processes 410-455 of method 400 may be implemented, at least in part, in the form of executable code stored on non-transitory, tangible, machine-readable media that when run by one or more processors may cause the one or more processors to perform one or more of the processes 410-455. In some embodiments, method 400 may correspond to the method used by the module 330.

At process 410, the language module receives an input sequence of tokens. At process 420, a set of active dictionaries (e.g., 108) are generated corresponding to the input sequence of tokens. Each active dictionary includes a plurality of pairs of source tokens from the input sequence of tokens. At process 430, a first output token is generated, at a first time step, by the language module. At process 440, in response to determining that the first output token is not the same as a first source token in at least one of the active dictionary, method 400 proceeds to process 443 to proceed to the next time step. Otherwise, in response to determining that the first output token is the same as a first source token in at least one of the active dictionary, method 400 proceeds to process 445, where a second output token is generated, at a second time step following the first time step, by the language module, a second output token. At process 450, in response to determining that the second output token matches with a second source token subsequent to the first source token, method 400 proceeds to process 455, where the second output token is blocked and another output token is regenerated. Otherwise, in response to determining that the second output token does not match with a second source token subsequent to the first source token, the second output token is adopted into the output sequence at process 453.

FIG. 5 provides a simplified pseudo-code algorithm for dynamic blocking, according to embodiments described herein. As illustrated in Algorithm 1, the source sequence S is represented as a list of tokens $S=(S_0, S_1, \ldots, S_M)$ and the generated sequence as $G=(G_0, G_1, \ldots, G_N)$. Suppose that during generation, the model generates $G_j$ that is identical to $S_i$ (it is not necessary that i=j). Then during generation of $G_{j+1}$, dynamic blocking forbids the model to generate the $S_{i+1}$ token, e.g., by enforcing the probability $P(G_{j+1}=S_{i+1}|S, (G_0, \ldots, G_j))=0$. This blocking action causes the generated sequence to deviate from the original one by enforcing $G_{j+1} \neq S_{i+1}$. Note that the blocking of $S_{i+1}$ only lasts for one step. After $G_{j+1}$ is generated, a different blocking may be performed if $G_{j+1} \in S$.

Example Performance

A new metric, referred to as BertBLEU is adopted to evaluate paraphrasing quality and serve a criterion to re-rank candidates during inference. As shown in FIG. 1, Dynamic Blocking leads to a collection of candidates because each sampled block dictionary is likely to result in a different surface form. Consequently, it is important to rank the most promising ones to the top. To that end, both semantic similarity and surface form dissimilarity to the source input are considered for re-ranking these candidates.

For semantic similarity, BERT-score (see Zhang et al., BERT score: Evaluating text generation with BERT, arXiv preprint arXiv:1904.09675, 2019), which computes the cosine similarity between each token in the candidate and that in the reference sentence using contextual embeddings. To ensure that key information (often conveyed through relatively rare words) is retained in the paraphrase, IDF-reweighing is also applied on each of the tokens.

To measure the surface-form dissimilarity, one minus self-BLEU is used, where self-BLEU is the BLEU score between the source and the candidate. The final score BertBLEU is a weighted harmonic mean of the BERT-score and one minus self-BLEU:

$$BertBLEU = \left( \frac{\beta * BERT - \text{score}^{-1} + 1.0 * (1 - selfBLEU)^{-1}}{\beta + 1.0} \right)^{-1},$$

$$Self\text{-}BLEU = BLEU(\text{source, candidate}).$$

As an extreme case, if the output copies through the input, then 1−self-BLEU=0; hence BertBLEU=0. β is used to control the relative importance between semantic similarity and surface-form dissimilarity. For example, β=4.0.

Various blocking strategies are considered. To improve paraphrasing quality, addition-ally block surface-form variations and closed-class are obtained words during Dynamic Blocking. The former refers to the capitalized and upper versions of a word (e.g. for the word "give", the variations are "Give" and "GIVE"), while the latter corresponds to pronouns, determiners, conjunctions, and prepositions, which are usually unsafe to block.

Example training datasets include Quora Question Pair (QQP) and the ParaNMT dataset. QQP contains 140K paraphrase pairs and 640K nonparallel sentences. The sizes of dev and test sets are 3K and 20K, respectively. The ParaNMT dataset was constructed by back-translating sentences in Czech in the CzEng dataset. The test set of SOW-REAP is obtained from Goyal et al., Neural syntactic preordering for controlled paraphrase generation. In Proceedings of the 58th Annual Meeting of the Association for Computational Linguistics, pp. 238-252, 2020. To match the size of their training set, for task-adaptation 350K nonparallel sentences are sampled from ParaNMT-5M, while to generate self-supervision data 350K sentences are sampled from the same corpus as in-puts. Note that any sentences are filtered out in SOW-REAP's test set to avoid training on test examples.

For the experiments on QQP, a supervised Transformer model is produced, which starts from the pre-trained T5-base. The model is also reproduced from Hegde et al., Unsupervised paraphrase generation using pre-trained language models, arXiv preprint arXiv:2006.05477, 2020, which is referred to as CorruptLM. This model is similar to the task-adaptive finetuning phase 215, except that they corrupt the inputs by removing all stop words rather than a fixed percentage of all words. Because the original paper did not provide the source of the stop words, the first 252 words are extracted from The Corpus of Contemporary American English to match the number. Instead of GPT-2 as used by their work, BART is used which shows stronger results on downstream tasks. The rest of the settings remain the same. For the experiments on ParaNMT, the SOW-REAP model released by Goyal et al. is used.

To evaluate the quality of paraphrasing, existing metrics such as iBLEU (Sun et al., Joint learning of a dual SMT system for paraphrase generation, in Proceedings of the 50th Annual Meeting of the Association for Computational Linguistics (Volume 2: Short Papers), pp. 38-42, 2012), BLEU (Papineni et al., Bleu: a method for automatic evaluation of machine translation, in Proceedings of the 40th Annual Meeting of the Association for Computational Linguistics, pages 311-318, 2002) and ROUGE (Lin, Rouge: A package for automatic evaluation of summaries. In Text summarization branches out, pages 74-81, 2004) on QQP, and report BLEU and ROUGE on ParaNMT. Note that for ParaNMT BLEU is calculated by first selecting the candidate that achieves the best sentence-level score with the ground truth, and then compute the corpus-level BLEU of all these candidates. Rouge scores are calculated in the same manner. In addition to the above metrics, the new metric Bert-BLEU is also reported for the models reproduced.

Extensive human evaluations on MTurk are provided. For each experiment, the final model is compared with the strongest models reported in both supervised and unsupervised settings. On QQP, the model is compared with supervised Transformer, unsupervised CorruptLM, and the ground-truth. On ParaNMT, the model is compared with SOW-REAP and the ground-truth. To construct holistic human studies, both head-to-head binary comparison and Likert-scale scoring are conducted. The former provides straightforward results on which model is stronger, while the latter is used to consolidate their relative positions.

For human evaluation, to ensure that the annotators are responsible and fluent in English, those who had completed more than 10K assignments, had an approval rate of >98%, and were located in the US are involved. Annotators are all native English speakers (specified in both the assignment description and the instructions). When comparing with a previous model, the annotators to identify which paraphrase they prefer. Annotators are not asked to separately evaluate semantic similarity and diversity because the latter is easy to check with self-BLEU. What is hard to evaluate with automatic metrics is the overall quality of the paraphrases. For each experiment, 200 examples are randomly sampled from the QQP's or ParaNMT's test set and shuffled the order of each example to anonymize the model identity. Each assignment was scored by two annotators.

Table 1 in FIG. 6 and Table 2 in FIG. 7 present human evaluation results on the final model compared with previous ones. On QQP the final model outperforms both Transformer and CorruptLM. Recall that CorruptLM also leverages a strong pre-trained language model. This indicates the effectiveness of the corruption strategies, task-adaptation, and self-supervised training when holding the language model factor as a constant. On ParaNMT the final model also outperforms SOW-REAP in both head-to-head and Likert-based evaluations. Moreover, the final model outperforms the ground-truth on both datasets. For QQP two reasons may be noted why these scores do not indicate that the final model can generate paraphrases with human-level quality. First, QQP is human-labeled, not human-generated—the latter should result in much better quality. Second, QQP is a re-purposed dataset, originally aiming to identify duplicate question pairs rather than paraphrases. Thus if one question infers another, or if they are just referring to the same topic, they may still be marked as duplicates.

As each assignment is scored by two annotators, Cohen's Kappa is used to evaluate the inter-annotator agreement. For head-to-head evaluations, kappa=0.35, indicating fair agreement. Note that when calculating kappa, all cases where either of the two annotators gives a "tie" score are left out because this usually signifies that they are unsure about which paraphrase is better.

Before presenting automatic evaluation results, it is first investigated how each of the automatic metrics correlates with the human evaluation results. In Table 3 of FIG. 8, it is shown that BertBLEU agrees more with human perceptions. The reason that BLEU itself does not correlate well with human perception is that there are two opposing forces. The first force comes from keeping the important information, such as named entities, which should be copied verbatim; the second force comes from using different wordings to express the same semantics—the better the model is at this (e.g. a model that fools all plagiarism checkers), the lower the BLEU becomes. For a model good at both, the gain in BLEU for matching key entities and the loss for using different wordings cancel each other, preventing BLEU from faithfully evaluating the paraphrasing quality. Consequently, BLEU is only useful for checking extreme cases: very low or high BLEU usually signals bad paraphrases, but for the middle ground cases BLEU alone is less indicative. A similar argument holds for ROUGE. In contrast, BERT-score encourages the first force while not punished by the second, positioning itself as a better metric. However, parroting the input will still fool BERT-score alone. Hence self-BLEU is also included to encourage diversity.

The automatic evaluation results on QQP are presented in Table 4 of FIG. 9. The final model achieves much better results on BertBLEU than the supervised Transformer and the unsupervised CorruptLM. As ablation studies on the two finetuning phases, namely task-adaptation and self-supervision, the final model also outperforms the one which only goes through the task-adaptation phase and the self-supervised model without Dynamic Blocking during inference. These ablation studies show that both the self-supervision phase and Dynamic Blocking are crucial to the paraphrasing quality. On the other metrics, the task-adapted and the self-supervised one without Dynamic Blocking during inference also obtain competitive results with the supervised model. However, in the last row, Copy-input achieves state-of-the-art results on all metrics except BertBLEU, indicating that iBLEU, BLEU, and the ROUGE scores are not reliable to evaluate paraphrasing quality. In contrast, the best model on BertBLEU achieves much lower iBLEU and BLEU scores compared with other models. On ParaNMT, better BertBLEU is also achieved than SOW-REAP, as shown in Table 5 of FIG. 10.

One special aspect of Table 5 in FIG. 10 is that: unlike on QQP, the performance of Copy-input on ParaNMT is the lowest among all models. However, this is not a completely fair comparison because all the other results are based on 10 candidates where only the ones with the highest sentence-level scores are retained for the final score computation. In contrast, Copy-input only has one candidate. Thus Copy-input and the other results are not directly comparable. Plus, SOW-REAP filters the dataset to only include syntactically diverse targets, which makes Copy-input less effective.

On the ParaNMT dataset, CorruptLM, when finetuned on non-parallel QQP, achieves much worse results than the other models (the CorruptLM (QQP) row in Table 5 of FIG. 10), indicating that it is less robust to domain shift. In contrast, the final model achieves similar results compared to the in-domain one under the same setting. Conversely, other than the Delete-Shuffle strategy presented herein, results for AddMask where corrupted words are replaced with a MASK token, and NoShuffle where shuffling does not happen after corrupting tokens. Note that only task-adaptation (i.e. no self-supervision) is performed for any of the results presented in this table.

Additional experiment is conducted with the final model finetuned on non-parallel ParaNMT and evaluated on QQP (the Final (ParaNMT) row in Table 4 of FIG. 9). This model achieves performance similar to that of the in-domain model as well. These results show that the final model may be able to perform task-adaptation using an arbitrary out-of-domain non-parallel corpus (e.g. C4) and still work well on the target domains.

During task adaptation, the corruption strategies involve both deletions and shuffling. In Table 6 of FIG. 11 ablations study results are provided for each of these strategies where either replacing words with masks is performed instead of deleting them or delete words without shuffling. The delete and shuffle strategy achieves a better BertBLEU score.

In Table 7 of FIG. 12, example paraphrases generated by the final model that exhibit syntactic structure variance are shown. Unlike previous work relying on explicit syntactic scaffolding, the final model achieves syntactic diversity "for free" from shuffling during task-adaptation.

The proposed dynamic blocking mechanism can also be expanded to generalization to other languages. Although BART is not explicitly trained on German corpus, the model is equipped with the capability to paraphrase in that language. With the aforementioned BART setting, Table 8 in FIG. 13 provides example paraphrasing in German. All candidates in German (left column) have different surface forms, while all translations in English (right column) share similar meanings. Therefore, the language model described herein can paraphrase in a non-English language. The paraphrasing quality may further improve if task-adaptation and self-supervision are applied to mBART or mT5.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I., entitled "Unsupervised Paraphrase Generation via Dynamic Blocking," 10 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of generating a paraphrase of an input sentence, the method comprising:
   receiving, at a data interface, the input sentence including a sequence of tokens;
   encoding, at an encoder of a language model, the sequence of tokens into an encoded vector representation;
   building a block dictionary comprising a plurality of block entries, wherein a block entry in the block dictionary maps each token in the input sentence to a respective successor token in the input sentence;
   sampling, according to a probability, a subset of block entries from the plurality of block entries in the block dictionary;
   generating, at a decoder of the language model, a set of candidate tokens subsequent to a previously emitted token via beam search in an encoded space based on the encoded vector representation;
   removing a first candidate token from the set of candidate tokens when the first candidate token equates to a successor token to the previously emitted token, and
   selecting, by the decoder of the language model, a second candidate token having a highest likelihood score among remaining candidate tokens in the set of candidate tokens; and
   generating an output paraphrase based at least in part on the selected second candidate token in response to the input sentence.

2. The method of claim 1, wherein the removing the first candidate token occurs at one time step.

3. The method of claim 1, further comprising:
   determining that the previously emitted token belongs to a particular block entry in the sampled subset of block entries, wherein the particular block entry maps the previously emitted token to the successor token.

4. The method of claim 1, further comprising:
   ranking the set of candidate tokens, wherein the first candidate token is ranked highest among the set of candidate tokens.

5. The method of claim 1, further comprising:
   emitting, by the decoder, the selected second candidate token as a token in the output paraphrase at a current time step.

6. The method of claim 1, wherein the language model is updated by task-adaptive training with training data that has been corrupted by token deletion and random shuffling.

7. The method of claim 6, wherein the language model is trained, subsequent to the task-adaptive training, with pseudo-labels generated from a task-adapted model after the task-adaptive training.

8. The method of claim 1, further comprising:
   computing a metric corresponding to the output paraphrase as a weighted harmonic mean of a first metric term and one minus a second metric term.

9. The method of claim 8, wherein the first metric term is computed based on a cosine similarity between each token in the output paraphrase and in a reference sentence.

10. The method of claim 8, wherein the second metric term is generated as a score between the input sentence and the output paraphrase.

11. A system for generating a paraphrase of an input sentence, the system comprising:
    a memory that stores a language model;
    a data interface that receives the input sentence including a sequence of tokens;
    a processor that reads instructions from the memory to perform:
      encoding, at an encoder of the language model, the sequence of tokens into an encoded vector representation;
      building a block dictionary comprising a plurality of block entries, wherein a block entry in the block dictionary maps each token in the input sentence to a respective successor token in the input sentence;
      sampling, according to a probability, a subset of block entries from the plurality of block entries in the block dictionary;
      generating, at a decoder of the language model, a set of candidate tokens subsequent to a previously emitted token via beam search in an encoded space based on the encoded vector representation;
      removing a first candidate token from the set of candidate tokens when the first candidate token equates to a successor token to the previously emitted token, and
      selecting, by the decoder of the language model, a second candidate token having a highest likelihood score among remaining candidate tokens in the set of candidate tokens; and
      generating an output paraphrase based at least in part on the selected second candidate token in response to the input sentence.

12. The system of claim 11, wherein the removing the first candidate token occurs at one time step.

13. The system of claim 11, wherein the processor further reads instructions from the memory to perform:
    determining that the previously emitted token belongs to a particular block entry in the sampled subset of block entries, wherein the particular block entry maps the previously emitted token to the successor token.

14. The system of claim 11, wherein the processor further reads instructions from the memory to perform:
    ranking the set of candidate tokens, wherein the first candidate token is ranked highest among the set of candidate tokens.

15. The system of claim 11, wherein the processor further reads instructions from the memory to perform:
    emitting, by the decoder, the selected second candidate token as a token in the output paraphrase at a current time step.

16. The system of claim 11, wherein the language model is updated by task-adaptive training with training data that has been corrupted by token deletion and random shuffling.

17. The system of claim 16, wherein the language model is trained, subsequent to the task-adaptive training, with pseudo-labels generated from a task-adapted model after the task-adaptive training.

18. The system of claim 11, wherein the processor further reads instructions from the memory to perform:
 computing a metric corresponding to the output paraphrase as a weighted harmonic mean of a first metric term and one minus a second metric term.

19. The system of claim 18, wherein the first metric term is computed based on a cosine similarity between each token in the output paraphrase and in a reference sentence.

20. The system of claim 18, wherein the second metric term is generated as a score between the input sentence and the output paraphrase.

* * * * *